United States Patent
Darugar et al.

(10) Patent No.: US 10,465,126 B2
(45) Date of Patent: Nov. 5, 2019

(54) RECOVERING BASE OIL FROM CONTAMINATED INVERT EMULSION FLUID FOR MAKING NEW OIL-/SYNTHETIC-BASED FLUIDS

(71) Applicant: BAKER HUGHES INCORPORATED, Houston, TX (US)

(72) Inventors: Qusai A. Darugar, Houston, TX (US); Billy M. Dye, Cypress, TX (US); Ibraheem T. Hussain, The Woodlands, TX (US); Melissa V. McCray, Houston, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 143 days.

(21) Appl. No.: 15/189,665

(22) Filed: Jun. 22, 2016

(65) Prior Publication Data

US 2016/0376509 A1 Dec. 29, 2016

Related U.S. Application Data

(60) Provisional application No. 62/184,469, filed on Jun. 25, 2015.

(51) Int. Cl.
| | |
|---|---|
| *C10G 29/22* | (2006.01) |
| *B01D 17/04* | (2006.01) |
| *E21B 21/06* | (2006.01) |
| *C09K 8/32* | (2006.01) |
| *B04B 1/00* | (2006.01) |
| *C09K 8/36* | (2006.01) |

(52) U.S. Cl.
CPC ............ *C10G 29/22* (2013.01); *B01D 17/041* (2013.01); *B01D 17/047* (2013.01); *E21B 21/065* (2013.01); *E21B 21/068* (2013.01); *C09K 8/36* (2013.01); *C10G 2300/208* (2013.01); *C10G 2400/04* (2013.01); *C10G 2400/22* (2013.01)

(58) Field of Classification Search
None
See application file for complete search history.

(56) References Cited

U.S. PATENT DOCUMENTS

| | | | |
|---|---|---|---|
| 5,605,872 A | 2/1997 | Engel et al. | |
| 5,837,655 A | 11/1998 | Halliday et al. | |
| 5,851,958 A | 12/1998 | Halliday et al. | |
| 7,754,661 B2 | 7/2010 | Smith et al. | |
| 8,997,896 B2 | 4/2015 | Clark et al. | |
| 2009/0107728 A1* | 4/2009 | Gaddis | E21B 21/062 175/66 |
| 2011/0220418 A1* | 9/2011 | Clark | E21B 21/068 175/66 |

* cited by examiner

*Primary Examiner* — Jeffrey D Washville
(74) *Attorney, Agent, or Firm* — Mossman, Kumar & Tyler, P.C.

(57) ABSTRACT

Base oil can be recovered from contaminated O/SBF by combining a chemical process with a mechanical process. The chemical treatment includes adding a demulsifier, an anionic surfactant, a non-ionic surfactant and/or a mutual solvent to the contaminated O/SBF in an amount effective to separate the base oil from the contaminated O/SBF fluid followed by mechanical separation of oil from water, and optionally from any solids present. The recovered base oil (i.e. conventional drilling fluid, conductive drilling fluid and constant rheology drilling fluid, etc.) may then be reformulated to make a new OBM of the same type from which the base oil was recovered, or as a fuel for engines.

8 Claims, 3 Drawing Sheets

US 10,465,126 B2

RECOVERING BASE OIL FROM CONTAMINATED INVERT EMULSION FLUID FOR MAKING NEW OIL-/SYNTHETIC-BASED FLUIDS

CROSS-REFERENCE TO RELATED APPLICATION

This application claims the benefit of U.S. Provisional Patent Application Ser. No. 62/184,469 filed Jun. 25, 2015, incorporated herein by reference in its entirety.

TECHNICAL FIELD

The present invention relates to methods for recovering base oils from contaminated invert emulsion drilling fluids, and in another one non-limiting embodiment, relates to methods for recovering base oils from contaminated invert emulsion drilling fluids and re-using them in invert emulsion drilling fluids of the same type from which they were recovered or as a fuel source.

BACKGROUND

Drilling fluids used in the drilling of subterranean oil and gas wells along with other drilling fluid applications and drilling procedures are well known. In rotary drilling there are a variety of functions and characteristics that are expected of drilling fluids, also known as drilling muds, or simply "muds".

Drilling fluids are typically classified according to their base fluid. In water-based muds, solid particles are suspended in water or brine. Oil can be emulsified in the water which is the continuous phase. Brine-based drilling fluids, of course are a water-based fluid (WBF) in which the aqueous component is brine. These may also be called water-based muds (WBMs). Oil-based fluids (OBFs) are the opposite or inverse. Solid particles are often suspended in oil, and water or brine is emulsified in the oil and therefore the oil is the continuous phase. Oil-based muds (OBMs) can be either all-oil based or water-in-oil macroemulsions, which are also called invert emulsions. In oil-based mud the oil can consist of any suitable oil that may include, but is not limited to, diesel, mineral oil, synthetic oil, esters, or olefins. OBFs as defined herein also include synthetic-based fluids or muds (SBFs or SBMs) which are synthetically produced rather than refined from naturally-occurring materials. SBFs often include, but are not necessarily limited to, olefin oligomers of ethylene, esters made from vegetable fatty acids and alcohols, ethers and polyethers made from alcohols and polyalcohols, paraffinic, or aromatic hydrocarbons, alkyl benzenes, terpenes and other natural products and mixtures of these types.

Inventory management of contaminated O/SBF is one of the biggest challenges in the oil and gas industry. When invert-emulsion drilling fluids are used during a drilling operation, they accumulate contaminants such as drill solids (up to about 20 vol %) and in some instances they also collect formation water. These contaminants have drastic effect on the properties of the drilling fluids. The most common method to reduce the effect of contaminants is to dilute the drilling fluid with base oil. However, this is not the ideal solution since it continues to increase the inventory. It should be understood that the term "contaminated O/SBF" includes, but is not necessarily limited to used OBFs and/or SBFs that has been used at least once as a drilling fluid, completion fluid, workover fluid, stimulation fluid, production fluid or some other oilfield or non-oilfield use, such as a metal cutting fluid.

It would be desirable if the base oil from contaminated O/SBF containing cuttings, drill solids, formation water and formation fluids could be recovered and reused in order to minimize growing the inventory.

SUMMARY

There is provided, in one non-limiting form, a method of recovering base oil from a contaminated O/SBF comprising of solids and water in oil emulsion, where the method comprises in this sequence: mixing at least one chemical with the contaminated O/SBF, where at least one chemical is selected from the group consisting of demulsifiers, anionic surfactants, non-ionic surfactants, mutual solvents, microemulsions, and combinations thereof, and where the chemical is mixed in an amount effective to break the water and oil emulsion; and the method further comprises mechanically separating the base oil, water and solids into three phases using a mechanical separator.

DETAILED DESCRIPTION

Figure 1:
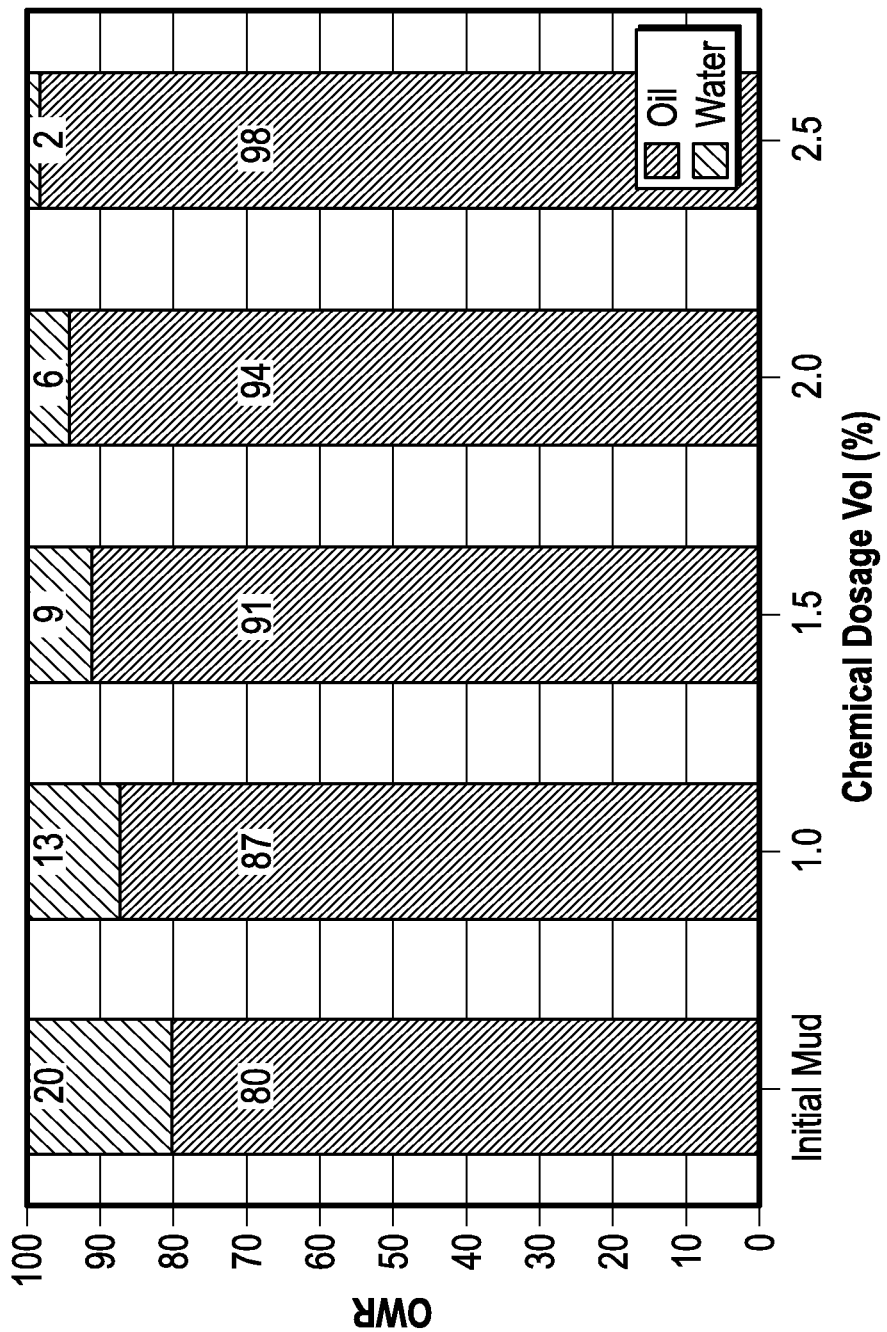
FIG. 1 graph illustrates the oil-water ratio of a contaminated O/SBF, along with the oil-water ratio of the recovered oil as a function of chemical dosage added to the O/SBF.

The base oil is the most expensive component of invert emulsion fluids per barrel. The inventive method provides the ability to recover base oil from contaminated O/SBF that has undesired properties to use the recovered base oil in new fluids. It has been discovered that base oil can be recovered from contaminated O/SBF using a process having at least one chemical step followed by at least one mechanical step. In brief, the chemical treatment includes adding an ionic surfactant, an anionic surfactant, or a non-ionic surfactant, microemulsion system, and/or one or more mutual solvent or a combination of these in an amount effective to break the emulsions in the fluid prior to mechanical separation of water, oil and solids into three distinct phases. Drilling fluids systems such as conductive oil base mud, constant rheology mud systems and/or mud systems for conventional land drilling can be made from recovered base oil of incumbent drilling fluid systems in the inventory. As noted, inventory management of contaminated O/SBF is one of the biggest challenges in the oil and gas industry. The recovered base oil may be advantageously used to formulate a new O/SBF of the same type from which the recovered base oil was separated or recovered. Additionally or alternatively, the recovered oil can also be used as a source of fuel for engines.

In more detail, the base oil in the contaminated O/SBF is selected from the group consisting of diesel, synthetic base oil, mineral base oil, paraffin and combinations thereof. Further, as defined here, the O/SBF (whether or not contaminated) includes, but is not necessarily limited to, production fluids, drilling fluids, completion fluids, stimulation fluids, and workover fluids, particularly those used in the exploration and discovery of hydrocarbons (e.g. crude oil, natural gas, etc.), but also other working fluids, such as metal cutting fluids and the like.

A non-limiting first step involves mixing at least one chemical into a contaminated O/SBF, where the chemical is selected from the group consisting of demulsifiers, anionic surfactants, non-ionic surfactants, mutual solvents, and combinations thereof, and where the chemical is present in an amount effective to separate the base oil from the water. The effective amount of the chemical used in the contaminated O/SBF ranges from about 0.5 independently to about 8.0 vol % chemical concentration; alternatively ranges from about 2 independently to about 5 vol %. This concentration range (which represents the total chemical concentration) is used when more than one chemical is present in the chemical treatment process. However, when a single chemical is used independently in the chemical treatment process, about 1.0 independently to about 5.0 vol % chemical concentration is the range specified; alternatively ranges from about 2 independently to about 3 vol %. When the term "independently" is used with respect to a range, any lower threshold may be used together with any upper threshold to give a suitable alternative range.

Further, if the chemical is an anionic surfactant, it is an anionic surfactant having a head group including, but not necessarily limited to, sulfate, sulfonate, phosphate, carboxylate, and combinations thereof. If the chemical is a nonionic surfactant, it may be selected from the group consisting of alkoxylated linear alcohols, fatty acid esters, alkylpolyglucosides, alkoxylated alkyl phenols, and combinations thereof. The chemical can also consist of microemulsion systems, selected from a group of anionic, non-ionic, cationic and mixtures thereof. Microemulsions are defined herein as an emulsion that is in thermodynamic equilibrium consisting of an isotropic liquid mixture of oil, water and surfactant, frequently in combination with a co-surfactant. If the chemical is a mutual solvent, it may be selected from the group consisting of glycol ethers, alcohols, and combinations thereof. In one non-limiting embodiment, suitable chemicals include, but are not necessarily limited to, dimethyl ester, a combination of benzenesulfonic acid and hexadecyl (sulfophenoxy)-, disodium salt and microemulsions based on dimethyl 2-methylglutarate.

After adding one or more of the above-noted chemicals to the O/SBF, the resulting treated fluid is subjected to physically separating, in one non-limiting embodiment using a three-phase centrifuge to recover the base oil. The physically separating in this step may be by centrifuging, in a non-limiting embodiment by using a three-phase centrifuge to remove the base oil, water and any solids into separate streams. If contaminated O/SBF contains a high degree of solids concentration, this step may be conducted in one or two stages. Most contaminated O/SBF is expected to contain solids of some type. In the first stage, the solids concentration is being reduced to at least 10 vol % from the contaminated O/SBF by using a two-phase centrifuge, followed by a second stage of separating the oil from the contaminated O/SBF. The separators used in each of the mechanical separation steps may be centrifuges or decanters.

In one non-limiting embodiment, the recovered base oil has an oil/water volume ratio of 95/5 or greater and/or less than 2 vol % low gravity solids (LGS) with a feeding flow rate of the treated mud going into the three-phase separator greater than 13 gallons (49 liters) per minute. In an alternate nonrestrictive version, the recovered base oil has an oil/water volume ratio of 98/2 or greater and/or less than 2.5-3.0 vol % LGS. Alternatively, the recovered base oil has less than 5 vol % low gravity solids. Low gravity solids are defined as those having a lower density than barite or hematite.

In one non-limiting embodiment the method has a feed rate of about 13 to about 15 gallons per minute (about 49 to about 57 liters per minute), the method has a recovered base oil rate of from about 10 to about 12 gallons per minute (about 38 to about 45 liters per minute), and the mechanically separated solids are solids remaining in the recovered oil phase having an average particle size between about 3 and about 98 microns. This is an unusual and unique set of process parameters. Alternatively, the method has a feed rate of 15 gallons per minute (about 57 liters per minute), a very low solids concentration in the recovered oil of about 1.26 vol % low gravity solids. In one non-limiting embodiment, the solids remaining in the recovered oil phase has the following distribution:

D10=3.2 microns
D50=16.3 microns
D90=97.4 microns.

In another non-limiting embodiment the distribution may be in the following ranges:

D10=2.5-3.5 microns
D50=10-20 microns
D90=80-110 microns

In a different non-restrictive version the distribution may be the following:

D10=4 microns
D50=18 microns
D90=10 microns.

It will be appreciated that the method herein may additionally include an option of reusing the recovered base oil in an application by either formulating a new O/SBM of the same type (for example, recovered diesel base oil can be used to make a diesel-based invert emulsion fluid, and synthetic base oil may be used to make synthetic-based invert emulsion fluid, etc.). New types of mud systems may also be formulated including, but not necessarily limited to, conductive oil base mud or constant rheology oil base mud systems that requires the same type of base oil as the oil recovered from the mud. Combusting the recovered base oil in an engine would also be an option. However, if the recovered base oil does not meet the specifications for an engine, it can be used as fuel source and combusted for other uses, or the recovered base oil can find other utilities, for instance as a metal cutting oil.

Examples of suitable organic materials for the oil of such system fluids include but are not necessarily limited to olefins, olefin oligomers of ethylene, water insoluble esters (such as those made from vegetable fatty acids and alcohols), ethers and polyethers made from alcohols and polyalcohols, paraffinic or aromatic hydrocarbons, alkyl benzenes, terpenes and other natural products and mixtures of these types, water insoluble polyglycols, diesel, water insoluble Fischer-Tropsch reaction products, and other organic materials, in one non-limiting embodiment materials that are non-toxic at the concentrations used, and combinations thereof. Suitable olefins are branched and/or linear and preferably are relatively non-toxic synthetic olefins. Examples of suitable olefins include but are not necessarily limited to polyalphaolefins, linear alpha olefins, and internal olefins, typically skeletally isomerized olefins. Most preferred olefins are described in U.S. Pat. Nos. 5,605,872 and 5,851,958, incorporated herein by reference in their entirety. Preferred paraffins are described in U.S. Pat. No. 5,837,655, incorporated herein by reference in its entirety. These olefins may include olefins having from about 14 to about 30 carbon atoms, including linear alpha-olefins having at least 16 carbon atoms. C20 is about the maximum length on the isomerized olefins currently employed as base oils, and the carbon number for some olefins is lower.

The used O/SBFs as well as the newly formulated O/SBFs may contain conventional additives, or additives developed in the future, for these drilling fluids including, but not necessarily limited to, solid weighting agents, lost circulation additives, filtration control additives, viscosifiers or rheology modifiers, emulsifiers, oil-wetting agents, lubricants, clays, tracers, brines, salts, alkalinity agents, acid gas scavengers, sweep materials, fluid loss control agents, and the like and combinations thereof. Suitable solid weighting agents include, but are not necessarily limited to, barite, hematite, calcium carbonate, siderite, ilmenite, heavy brines, galena, and the like and combinations thereof. Suitable lost circulation or fluid loss control additives, include, but are not necessarily limited to, lignite, asphalts, gilsonites, synthetic polymers and the like. Suitable viscosifiers include, but are not necessarily limited to, organophilic bentonite, attapulgite, sepiolite and dimeric and trimeric fatty acids, imidazolines, amides, synthetic polymers, and the like and combinations thereof. These conventional solid additives may be removed using the methods of solids separation described herein, which may also remove drill cuttings that are contained in the contaminated O/SBF.

The invention will now be described with respect to some examples that are not intended to limit the method, but to simply provide non-restrictive examples of how the method may be implemented.

Example 1

An initial contaminated O/SBF was used having an 80/20 oil/water ratio (OWR). Chemical dosages in the amount of 1.0-2.5 vol % were mixed into the contaminated O/SBF, and then the mixtures were subjected to mechanical separation using a three-phase centrifuge. The chemical used was dimethyl 2-methylglutarate, The OWRs resulting for each dosage are presented in FIG. 1. It may be seen that as more chemical was added, less water resulted in the recovered base oil.

Figure 2:
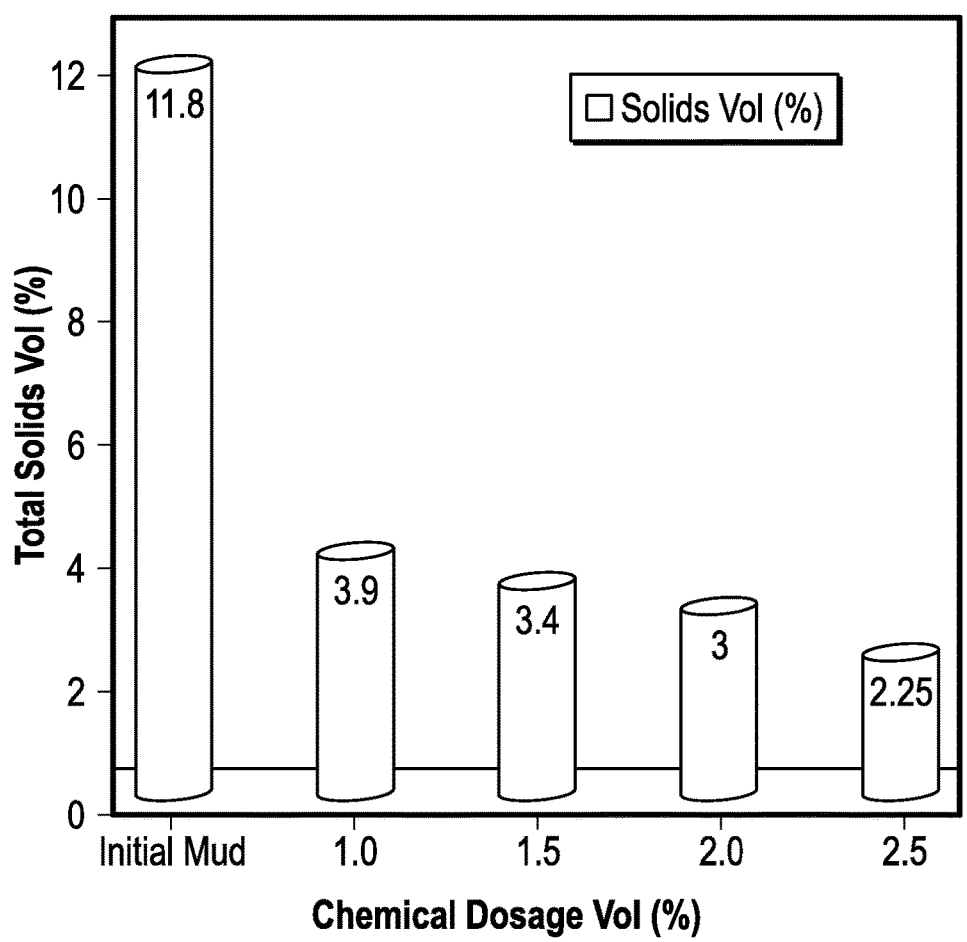
FIG. 2 graph illustrates the total amount of retained solids in the recovered base oil in vol % after the indicated dosages of chemical was added to the contaminated O/SBF of FIG. 1.

Furthermore, the total solids remaining in the recovered base oil as a volume percent for each of the four chemical dosages is presented in FIG. 2, where the recovered base oil has been subjected to the chemical treatment and mechanical separation steps described herein. The % solids are a combination of low gravity solids (LGS), high gravity solids (HGS) and soluble salts. Again, it may be seen that the vol % solids decreases with increasing amounts of chemical added.

Figure 3:
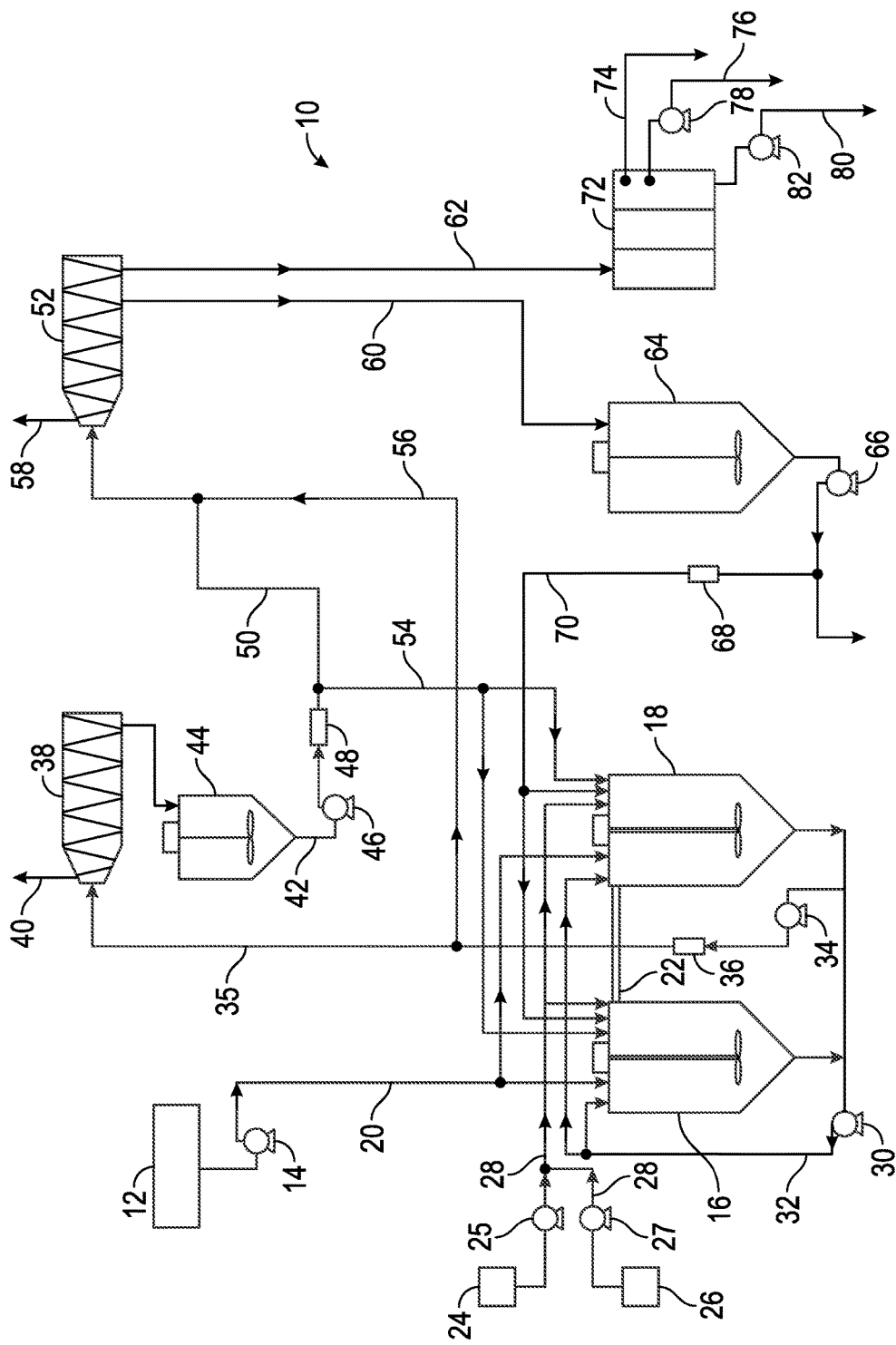
FIG. 3 is a schematic illustration of one non-limiting embodiment of a base oil recovery system in accordance with the method described herein.

Shown in FIG. 3 is a schematic illustration of one non-limiting embodiment of a base oil recovery system 10 in accordance with the method described herein. Contaminated O/SBF is fed from holding tank for initial contaminated O/SBF (no chemicals are added into this tank) 12 via centrifugal pump 14 to one of two mixing tanks 16 or 18 via line 20 (from initial contaminated O/SBF holding tank). Two mixing tanks 16 and 18 are used to facilitate a continuous process. While one of the tanks 16 or 18 is being filled with contaminated O/SBF, the other tank 18 or 16 is in the process of mixing at least one chemical with the contaminated O/SBF. Mixing tanks 16 and 18 have a line 22 establishing communication between them; line 22 is for equalizing, and in case of overflow from one tank to the other.

First "tote tank" 24 contains a first chemical and second "tote tank" 26 contains a second chemical (in the optional embodiment where two chemicals are used) which are fed to mixing tanks 16 and 18 via electrical diaphragm adjustable pumps for chemical injection 25 and 27, respectively, and lines 28. Mixing tanks 16 and 18 thoroughly mix the first and second chemicals with the contaminated O/SBF to form a mixture. Transfer line 32 may recycle the mixture via centrifugal pump 30. The fluid in transfer line 32 is a recycled fluid being reprocessed (fluid is sent through two-phase centrifuge, then the same fluid with the addition of chemical(s) is sent through the three-phase centrifuge) and then to the recovered oil tank 64. The mixture is fed via centrifugal pump 34 and feed line from mixing tanks 16, 18 and feed line 35 through flow meter 36 which regulates flow of the mixture to two-phase centrifuge 38 (e.g. a decanter or centrifuge). As previously noted, it is expected that most contaminated O/SBF will contain solids, thus two-phase centrifuge 38 separates solids, for instance by centrifugation, to give solids discharge stream 40 from two-phase centrifuge 38 and water and oil emulsion stream 42 which goes to optional holding/mixing tank 44, which stream is pumped via centrifugal pump 46 through flow meter 48 through line 50 to three-phase centrifuge 52, although a portion of the water and oil emulsion stream may be recycled to mixing tanks 16 and/or 18 via transfer line 54.

The mixture may optionally bypass two-phase separator 38 and go directly to three-phase centrifuge 52 via bypass line 56 in the event that the mixture has reduced, minimal or essentially no solids.

Three-phase centrifuge 52 (e.g. decanter or centrifuge) separates the mixture and/or the water and oil emulsion into solids discharge stream from three phase centrifuge 58, recovered base oil stream 60 and process water (heavy phase) stream 62. Recovered base oil stream 60 is transferred to recovered oil tank 64 which collects the recovered oil from the process from where it is pumped to reserve tanks (not shown) via recovered base oil centrifugal pump 66. A portion of this oil may be passed to mixing tanks 16 and 18 through flow meter 68 and base oil recycle line 70. Process water (heavy phase) stream 62 is transferred to oil skimmer tank 72 for further separating the base oil 74 (by way of skimming discharge), processed water discharge 76 transferred via centrifugal pump 78 and solid discharge line 80 transferred via pump 82. Recovered base oil stream 60 and separated base oil (by way of skimming discharge) 74 gives the recovered base oil of the method described herein.

In the foregoing specification, the invention has been described with reference to specific embodiments thereof, and has been suggested as effective in providing effective methods for recovering base oils from contaminated O/SBF. However, it will be evident that various modifications and changes may be made thereto without departing from the broader scope of the invention as set forth in the appended claims. Accordingly, the specification is to be regarded in an illustrative rather than a restrictive sense. For example, specific contaminated O/SBF, chemicals, demulsifiers, anionic surfactants, non-ionic surfactants, mutual solvents, and proportions thereof, different chemical treatments, and different mechanical separations falling within the claimed parameters, but not specifically identified or tried in a particular method to improve recover base oils, are anticipated to be within the scope of this invention.

The present invention may suitably comprise, consist or consist essentially of the elements disclosed and may be practiced in the absence of an element not disclosed. For instance, in a method of recovering base oil from a contaminated O/SBF comprising solids, and a base oil and water in a water and oil emulsion, the method may comprise, consist essentially of or consist of, in this sequence, mixing at least one chemical with the contaminated O/SBF, where the at least one chemical is selected from the group consisting of demulsifiers, anionic surfactants, non-ionic surfactants, mutual solvents, microemulsions, and combinations thereof, and where the chemical is present in an amount effective to break the oil and water emulsion; and mechanically separating the base oil from the water and solids using a mechanical separator giving recovered base oil.

As used herein, the terms "comprising," "including," "containing," "characterized by," and grammatical equivalents thereof are inclusive or openended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method of recovering base oil from a contaminated O/SBF comprising solids, and a base oil and water in a water and oil emulsion, the method consisting of in this sequence:
    mixing at least one microemulsion with the contaminated O/SBF
        where the microemulsion concentration ranges from about 0.5 to about 8.0 vol %;
    mechanically separating the base oil from the water and solids using a three-phase centrifuge to give recovered base oil; and
    reusing the recovered base oil in an application selected from the group of applications consisting of:
        formulating a new O/SBF of the same type that the recovered base oil was separated from; and
        combusting the recovered base oil as a fuel source.

2. The method of claim 1 where the base oil in the contaminated O/SBF is selected from the group consisting of diesel, mineral oil, a synthetic base oil, esters, olefins, paraffins and combinations thereof.

3. The method of claim 1 where
    the microemulsion comprises a surfactant selected from a group of anionic surfactants, nonionic surfactants, cationic surfactants, and combinations thereof.

4. The method of claim 1 where the recovered base oil has an oil/water volume ratio of 95/5 or greater and less than 2 vol % low gravity solids.

5. The method of claim 1 where:
    the method has a feed rate of about 13 to about 15 gallons per minute (about 49 to about 57 liters per minute);
    the method has a recovered base oil rate of from about 10 to about 12 gallons per minute (about 38 to about 45 liters per minute);
    the recovered base oil has less than 5 vol % low gravity solids; and
    the mechanically separated solids are solids remaining in the recovered oil phase having an average particle size between about 3 and about 98 microns.

6. A method of recovering base oil from a contaminated O/SBF comprising solids, and a base oil and water in a water and oil emulsion, the method consisting of in this sequence:
    mixing at least one microemulsion with the contaminated O/SBF
        where the microemulsion concentration ranges from about 0.5 to about 8.0 vol %;
    mechanically separating the base oil from the water and solids using a three-phase centrifuge to give recovered base oil; and
    reusing the recovered base oil in an application selected from the group of applications consisting of:
        formulating a new O/SBF of the same type that the recovered base oil was separated from; and
        combusting the recovered base oil as a fuel source;
    where
        the microemulsion comprises a surfactant selected from a group of anionic surfactants, nonionic surfactants, cationic surfactants, and combinations thereof;
    and
    where:
        the method has a feed rate of about 13 to about 15 gallons per minute (about 49 to about 57 liters per minute);
        the method has a recovered base oil rate of from about 10 to about 12 gallons per minute (about 38 to about 45 liters per minute);
        the recovered base oil has less than 5 vol % low gravity solids; and
        the mechanically separated solids are solids remaining in the recovered oil phase having an average particle size between about 3 and about 98 microns.

7. The method of claim 6 where the base oil in the contaminated O/SBF is selected from the group consisting of diesel, mineral oil, a synthetic base oil, esters, olefins, paraffins and combinations thereof.

8. The method of claim 6 where the recovered base oil has an oil/water volume ratio of 95/5 or greater and less than 2 vol % low gravity solids.

* * * * *